United States Patent [19]
Tzen et al.
[11] Patent Number: 4,641,436
[45] Date of Patent: Feb. 10, 1987

[54] RULER

[76] Inventors: Ching B. Tzen; Tzu P. Liang, both of No. 259, Chung Ming South Road, Taichung City, Taiwan

[21] Appl. No.: 879,626
[22] Filed: Jun. 27, 1986
[51] Int. Cl.[4] .......... G01B 3/02
[52] U.S. Cl. .......... 33/483; 33/494; 33/1 B
[58] Field of Search .......... 33/483, 494, 41 R, 41 B, 33/1 B, 566, 1 C

[56] References Cited

U.S. PATENT DOCUMENTS

| | | | |
|---|---|---|---|
| 1,544,327 | 6/1925 | Loewenthal | 33/1 B |
| 2,722,055 | 11/1955 | Rader | 33/483 |
| 4,171,573 | 10/1979 | Picciotto | 33/1 B |
| 4,221,057 | 9/1980 | Luikart | 33/494 |
| 4,565,012 | 1/1986 | Bilodeau et al. | 33/483 |
| 4,584,780 | 4/1986 | Pressey | 33/1 B |

*Primary Examiner*—Willis Little
*Attorney, Agent, or Firm*—Bacon & Thomas

[57] ABSTRACT

A transparent ruler with a U-shaped slot, a multiplicity of separate scales, and reference numbers. The scales are exactly perpendicular to each other, with one being horizontal and the others being vertical. Three slots are on the ruler, two of which are parallel with the vertical scales and one of which is parallel to the horizontal scale. The slots intersect so as to form one big square U-shaped slot. There are arrows on the top and side edges of the ruler which are collinear with the slots. These arrows are used for reference purposes when extending a line, squaring a line with respect to another line, etc. The vertical scales are used to draw perfectly parallel lines with respect to the horizontal slot.

2 Claims, 4 Drawing Figures

RULER

BACKGROUND OF THE INVENTION

This invention relates to a ruler which can be used to precisely line up parallel lines, square off perpendicular lines, or extend lines. Previous rulers only allowed for approximate alignment in the above-mentioned cases. Since previous rulers were so troublesome, most people would prefer to line up or square off lines by eye than measure precisely enough to get an exactly parallel, square or straight line. The other alternative, is to buy drafting equipment which admittedly simplifies the above functions. This alternative, however, is prohibitively expensive and unnecessary for the average user.

This present invention, therefore, seeks to allow the user to easily draw essentially square, parallel, or straight lines, without tedious measuring, in the manner set forth in the detailed description of the preferred embodiment.

SUMMARY

A primary objective of this invention is to provide a means of precisely and quickly drawing parallel, perpendicular or extended lines without reference measuring or expensive drafting equipment.

Another objective of this invention is to provide a ruler with both a vertical and a horizontal scale.

Further objectives and advantages of the present invention will become apparent as the following description proceeds, and the features of novelty which characterize the invention are pointed out with particularity in the claims annexed to and forming a part of this invention.

DETAILED DESCRIPTION OF THE PREFERRED EMBODIMENT

Figure 1:
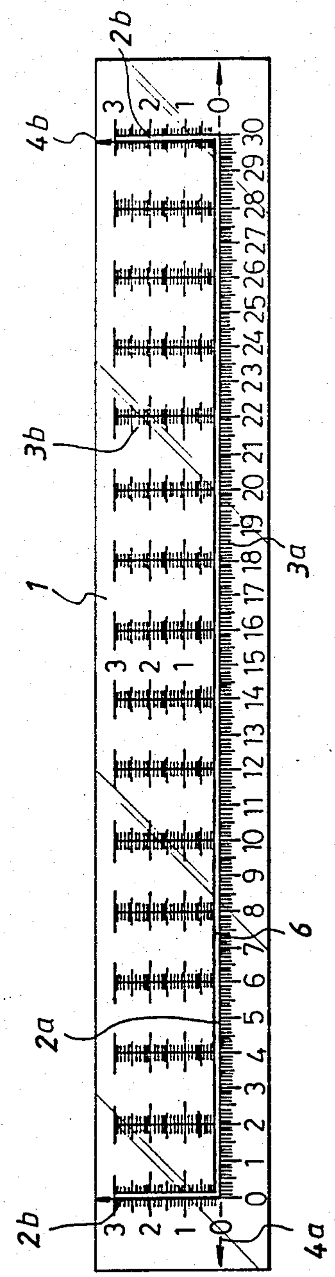
FIG. 1 is an elevational view of the present invention.

Referring to FIG. 1, it can be seen that the ruler 1 of the present invention comprises a multiplicity of vertical scales 3*b*, a horizontal scale 3*a*, two vertical slots 2*b*, a horizontal slot 2*a*, two horizontal alignment arrows 4*a*, and two vertical alignment arrows 4*b*.

Figure 2:
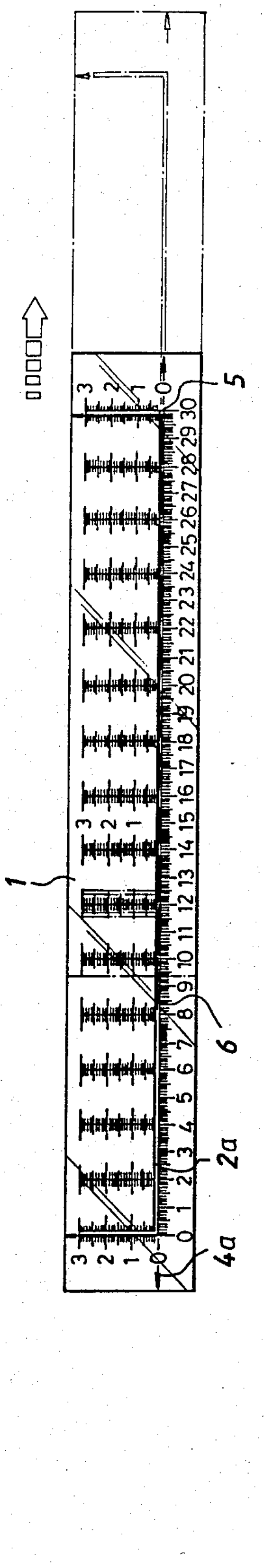
FIG. 2 is a working view of the present invention, showing how lines can be precisely and quickly extended without deviating from the original axis of the line.

Referring to FIG. 2, the method for precisely and quickly extending lines can be seen. First, a line 6 is drawn in slot 2*a*. Then the ruler may be slid to the right as indicated by the broken arrow, so that it rests in the position indicated by hidden lines. Horizontal alignment arrow 4*a*' is then used as a reference so that the end of the ruler can be exactly aligned along line 6. The right hand portion of line 6 is also centered in slot 2*a*. Because line 6 is centered in the middle of the slot 2*a*, it is much easier to extend a straight line than when only the conventional straight edge is used. This is due to the fact that when using a conventional straight edge the user may draw the actual line at varying distances from the edge itself, thereby distorting the line, whereas lines drawn using the present ruler 1 are always correctly aligned in one of the above-mentioned slots.

Figure 3:
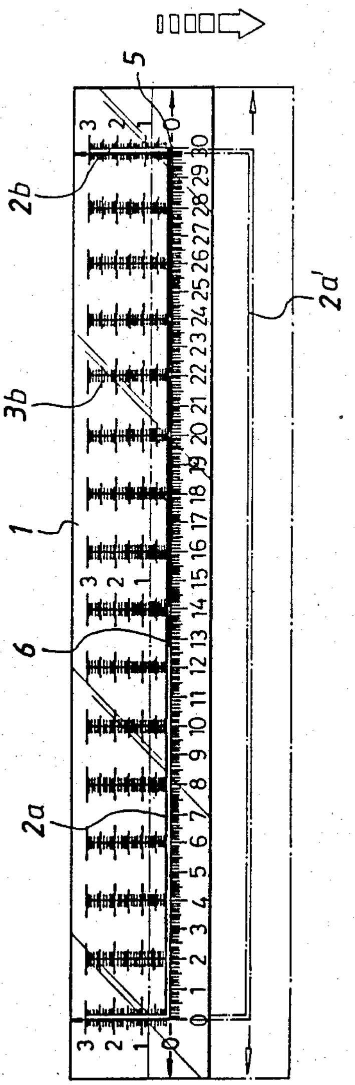
FIG. 3 is a working view of the present invention, showing how parallel lines may be precisely and quickly drawn.

Referring to FIG. 3, a method for drawing essentially parallel lines using the present invention can be seen. First, a line 6 is drawn in the horizontal alignment slot 2*a*. Then, the ruler 1 is slid downwards in the direction indicated by the broken arrow to the desired new position, which is indicated in FIG. 3 by hidden lines. Then the line 6 can be easily lined up along the vertical scales 2*b*, which are evenly spaced across the ruler 1. For instance, if the parallel lines are to be seperated by 22 mm, then the vertical scales 2*b* are all lined up at the 22 mm point along line 6. Therefore, when the new (parallel) line is drawn, it will be exactly 22 mm at all points from original line 6. Thus the user is saved from inconvenient reference measurements which would be necessary if using a conventional ruler.

Figure 4:
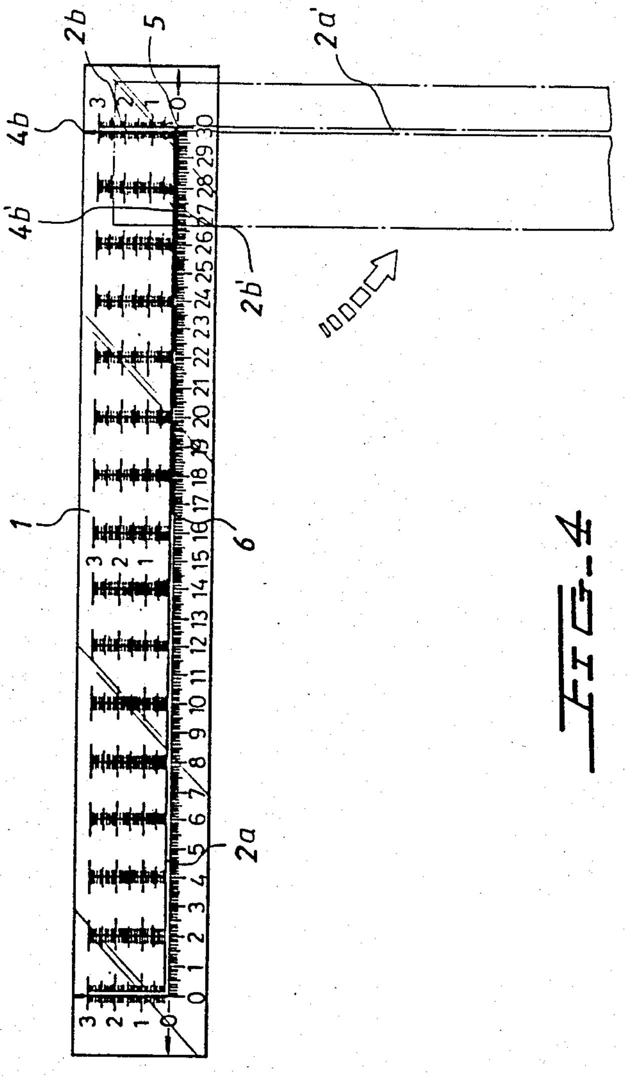
FIG. 4 is a working view of the present invention, showing how perpendicular lines may be precisely and quickly extended.

Now referring to FIG. 4, a method for drawing lines which are substantially at right angles from each other using the present invention can be seen. First, the ruler 1 is placed in position and line 6 is drawn in slot 2*a*. Also, a point 5 can be made at the end of line 6 at the intersection of the vertical and horizontal slots. Then the ruler is slid in the direction indicated by the broken arrow to its new position. Lining up vertical alignment arrow 2*b*' with the original line 6 and putting point 5 in slot 2*a*', a new line may be drawn which is for all practical purposes perpendicular to the original line 6.

Obviously, this invention would work equally well with any other scale besides the metric scale shown.

As various possible embodiments might be made of the above invention without departing from the scope of the invention, it is to be understood that all matter herein described or shown in the accompanying drawing is to be interpreted as illustrative and not in a limiting sense. Thus it will be appreciated that the drawings are exemplary of a preferred embodiment of the invention.

We claim:

1. An improved ruler comprising a multiplicity of identical vertical scales, a horizontal scale, two vertical slots which are positioned near the ends of said ruler, a horizontal slot which is positioned at the bottom end of said ruler adjacent to said horizontal scale, two horizontal alignment arrows having tips extending to the left and right edges of said ruler and which are collinear with said horizontal slots and two vertical alignment arrows having tips which extend to the top edge of said ruler and which are collinear to said vertical slot, said slots intersecting so as to form a square U-shaped slot.

2. An improved ruler, as set forth in claim 1, wherein all scales are metric.

* * * * *